US010053992B2

(12) United States Patent
Quach et al.

(10) Patent No.: US 10,053,992 B2
(45) Date of Patent: Aug. 21, 2018

(54) GAS TURBINE ENGINE AIRFOIL SQUEALER POCKET COOLING HOLE CONFIGURATION

(71) Applicant: United Technologies Corporation, Hartford, CT (US)

(72) Inventors: San Quach, East Hartford, CT (US); Scott D. Lewis, Vernon, CT (US); Steven Bruce Gautschi, Naugatuck, CT (US); Christopher King, Bristol, CT (US); Christopher Corcoran, Manchester, CT (US); David Donald Chapdelaine, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 293 days.

(21) Appl. No.: 14/790,231

(22) Filed: Jul. 2, 2015

(65) Prior Publication Data

US 2017/0002663 A1 Jan. 5, 2017

(51) Int. Cl.
*F01D 5/18* (2006.01)
*F01D 5/20* (2006.01)

(52) U.S. Cl.
CPC .......... *F01D 5/20* (2013.01); *F05D 2260/202* (2013.01); *Y02T 50/673* (2013.01); *Y02T 50/676* (2013.01)

(58) Field of Classification Search
CPC . F01D 5/20; F01D 5/186; F01D 5/187; F01D 5/18; F01D 5/225; F05D 2260/202;
(Continued)

(56) References Cited

U.S. PATENT DOCUMENTS 3,854,842 A * 12/1974 Caudill .................. F01D 5/147
415/115
5,183,385 A 2/1993 Lee et al.
(Continued)

FOREIGN PATENT DOCUMENTS

EP 1557533 7/2005
EP 2716870 4/2014
(Continued)

OTHER PUBLICATIONS

Extended European Search Report for European Application No. 16177489.8 dated Dec. 16, 2016.
(Continued)

*Primary Examiner* — Kenneth Bomberg
*Assistant Examiner* — Julian Getachew
(74) *Attorney, Agent, or Firm* — Carlson, Gaskey & Olds, P.C.

(57) ABSTRACT

A gas turbine engine airfoil includes a body that provides an exterior airfoil surface that extends in a radial direction to a tip. The exterior surface has a leading edge in a forward direction and a trailing edge in an aft direction. The tip includes a squealer pocket that has a recess surface. A cooling passage is arranged in the body. Each of the cooling holes extends from an inlet at the cooling passage to an outlet at the recessed surface. The inlet and outlet are arranged at an angle in an angular direction relative to the recessed surface. The angular direction is toward at least one of the forward and aft directions.

14 Claims, 5 Drawing Sheets

(58) Field of Classification Search
CPC ......... F05D 2260/201; F05D 2240/125; F05D 2240/307
See application file for complete search history.

(56) References Cited

U.S. PATENT DOCUMENTS

| | | | |
|---|---|---|---|
| 5,326,224 A * | 7/1994 | Lee | F01D 5/186 416/90 R |
| 6,672,829 B1 | 1/2004 | Cherry et al. | |
| 7,281,894 B2 * | 10/2007 | Lee | F01D 5/20 415/173.1 |
| 7,537,431 B1 | 5/2009 | Liang | |
| 7,584,538 B2 | 9/2009 | Lee | |
| 7,704,045 B1 | 4/2010 | Liang | |
| 7,997,865 B1 | 8/2011 | Liang | |
| 8,011,889 B1 | 9/2011 | Liang | |
| 8,043,058 B1 | 10/2011 | Liang | |
| 8,092,178 B2 | 1/2012 | Marini et al. | |
| 8,167,572 B2 | 5/2012 | Tardif et al. | |
| 8,313,287 B2 | 11/2012 | Little | |
| 8,435,004 B1 | 5/2013 | Liang | |
| 8,469,666 B1 | 6/2013 | Liang | |
| 8,801,377 B1 | 8/2014 | Liang | |
| 2010/0232979 A1 * | 9/2010 | Paauwe | F01D 5/186 416/97 R |
| 2011/0176929 A1 | 7/2011 | Ammann et al. | |
| 2013/0136225 A1 * | 5/2013 | Michaels | G01B 15/045 378/4 |
| 2013/0266454 A1 | 10/2013 | Mongillo, Jr. et al. | |
| 2014/0047842 A1 | 2/2014 | Chlus et al. | |
| 2014/0099193 A1 * | 4/2014 | Zhang | F01D 5/20 415/178 |

FOREIGN PATENT DOCUMENTS

| | | |
|---|---|---|
| EP | 2775101 | 9/2014 |
| EP | 2944764 | 11/2015 |

OTHER PUBLICATIONS

U.S. Appl. No. 14/696,601, filed Apr. 27, 2015.
U.S. Appl. No. 14/704,022, filed May 5, 2015.

* cited by examiner

GAS TURBINE ENGINE AIRFOIL SQUEALER POCKET COOLING HOLE CONFIGURATION

STATEMENT REGARDING FEDERALLY SPONSORED RESEARCH OR DEVELOPMENT

This invention was made with government support under Contract No. N68335-13-C-0005 awarded by the United States Navy. The Government has certain rights in this invention.

BACKGROUND

This disclosure relates to a gas turbine engine airfoil. More particularly, the disclosure relates to a cooling configuration in an airfoil squealer pocket.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine.

Many blades include internal cooling passages in their airfoils that supply a cooling fluid to cooling holes that extend through to the exterior surface of the airfoil. The airfoils extend from a platform to a tip. Some airfoil tip designs include a squealer pocket, which is a depression in the tip. Squealer pockets may include cooling holes, which deliver cooling fluid to the tip.

Turbine airfoils or outer air seals operate in an environment where the gas temperatures often exceed the material capability therefore they require cooling features to protect against damage. Cooling air from the compressor is used to provide internal convection cooling inside the airfoils. The problem with high amounts of cooling air is that less gas is available for work extraction, therefore, the engine efficiency is reduced with higher amounts of cooling. As demands for increase for higher thrust or efficiency, the airfoil designer is faced with increasing turbine inlet temperatures or reduced cooling flow allocation.

Blade tips are highly susceptible to erosion, oxidation, and thermal mechanical fatigue damage due to high thermal heat load. Consequently airfoil design and durability engineers currently implement cooling schemes that include squealer pockets, cooling holes, and/or tip shelves of any size to preserve the integrity of the tip. In many current designs, squealer pockets of various sizes and shapes are applied at the tip in conjunction with radial purge cooling holes. In some instances they may be used concurrently with tip shelves. While the squealer pocket itself reduces the external heat load on the tip due to causing flow separation within it and reducing thermal mass, the cooling hole supplies cooling air that mixes with the tip leakage flow and forms a pocket of cool air. The holes are generally angled at 90 degrees to the tip leakage, and provide film coverage downstream of the squealer pocket.

SUMMARY

In one exemplary embodiment, a gas turbine engine airfoil includes a body that provides an exterior airfoil surface that extends in a radial direction to a tip. The exterior surface has a leading edge in a forward direction and a trailing edge in an aft direction. The tip includes a squealer pocket that has a recess surface. A cooling passage is arranged in the body. Each of the cooling holes extends from an inlet at the cooling passage to an outlet at the recessed surface. The inlet and outlet are arranged at an angle in an angular direction relative to the recessed surface. The angular direction is toward at least one of the forward and aft directions.

In a further embodiment of the above, the angular direction of at least one of the cooling holes is toward the forward direction.

In a further embodiment of any of the above, the angular direction of at least one of the cooling holes is toward the aft direction.

In a further embodiment of any of the above, the angular direction of at least one of the cooling holes is toward the forward direction and the angular direction of at least another one of the holes is toward the aft direction.

In a further embodiment of any of the above, the exterior airfoil surface includes pressure and suction side joined at the leading and trailing edges. The angular directions of one set of cooling holes nearest the pressure side are arranged toward one of the forward and aft directions. The angular directions of another set of cooling holes nearest the suction side are arranged toward the other of the forward and aft directions.

In a further embodiment of any of the above, the pressure side cooling holes are arranged toward the aft direction, and the suction side cooling holes are arranged toward the forward direction.

In a further embodiment of any of the above, the cooling holes are arranged in an arc. The angular direction of each cooling hole is arranged toward an adjacent cooling hole.

In a further embodiment of any of the above, the angle is a first angle in a range of between 10° and 90°.

In a further embodiment of any of the above, the tip is configured to receive a flow path fluid in a flow direction. The cooling holes are at a second angle of 90°+/−60° with respect to the flow direction.

In a further embodiment of any of the above, the body is a turbine blade.

In a further embodiment of any of the above, the tip includes multiple squealer pockets.

In a further embodiment of any of the above, the tip includes a partial tip shelf.

In a further embodiment of any of the above, the tip includes a full tip shelf.

In another exemplary embodiment, a gas turbine engine airfoil includes a body that provides an exterior airfoil surface that extends in a radial direction to a tip. The exterior surface has a leading edge in a forward direction and a trailing edge in an aft direction. The exterior airfoil surface includes pressure and suction side joined at the leading and trailing edges. The tip includes a squealer pocket that has a recess surface. A cooling passage is arranged in the body. Each of the cooling holes extends from an inlet at the cooling passage to an outlet at the recessed surface. The inlet and outlet are arranged at an angle in an angular direction relative to the recessed surface. The angular direction is toward at least one of the pressure and suction sides.

In a further embodiment of any of the above, the angular direction of at least one of the cooling holes is toward the pressure side.

In a further embodiment of any of the above, the angular direction of at least one of the cooling holes is toward the suction side.

In a further embodiment of any of the above, the angular direction of at least one of the cooling holes is toward the pressure side and the angular direction of at least another one of the holes is toward the suction side.

In a further embodiment of any of the above, the angle is a first angle in a range of between 10° and 90°.

In a further embodiment of any of the above, the tip is configured to receive a flow path fluid in a flow direction. The cooling holes are at a second angle of 90°+/−60° with respect to the flow direction.

In a further embodiment of any of the above, the body is a turbine blade.

In a further embodiment of any of the above, the tip includes multiple squealer pockets.

In a further embodiment of any of the above, the tip includes a partial tip shelf.

In a further embodiment of any of the above, the tip includes a full tip shelf.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
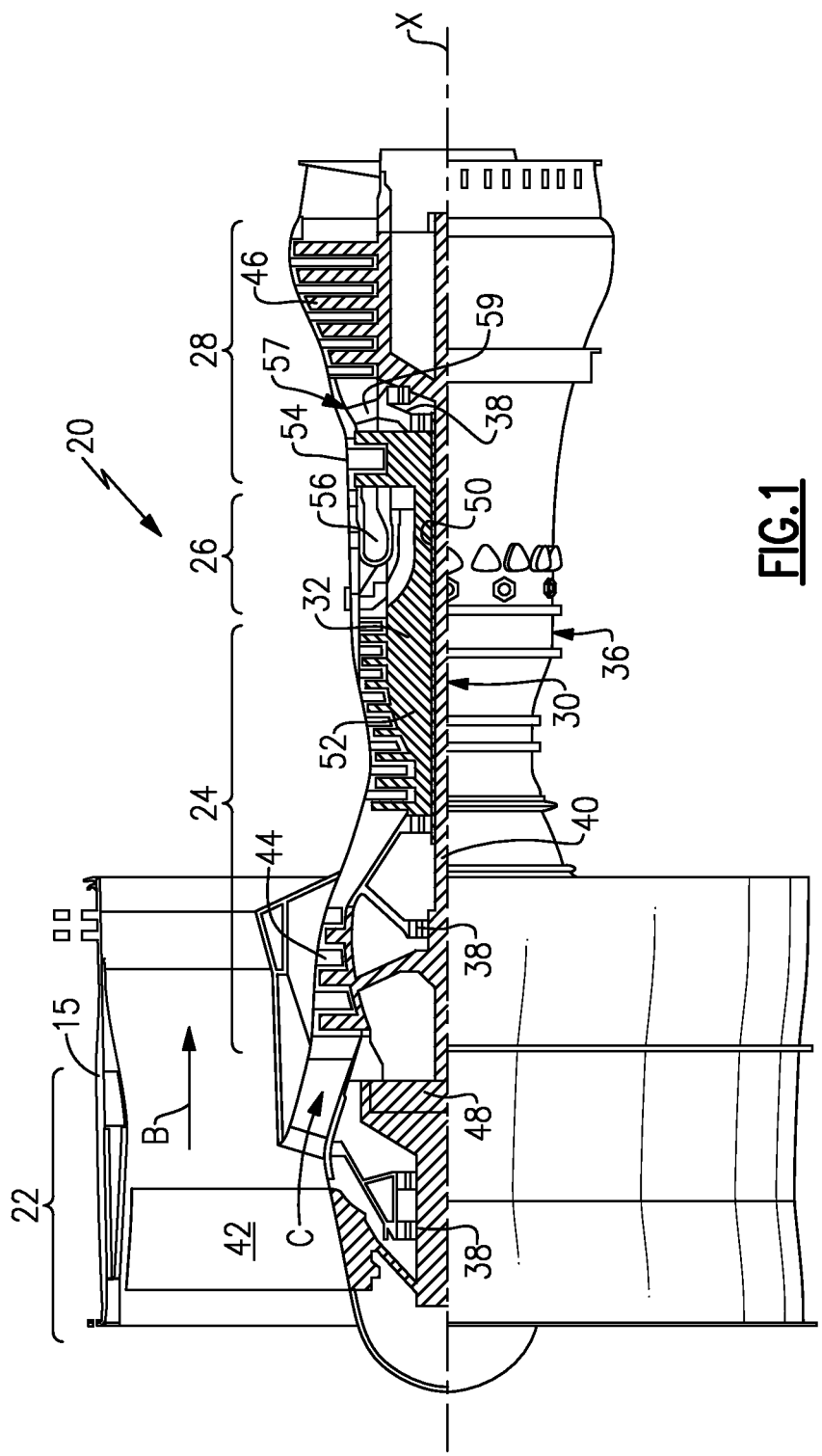
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°\text{ R})/(518.7°\text{ R})]^{0.5}$. The "Low corrected fan tip speed" as disclosed herein according to one non-limiting embodiment is less than about 1150 ft/second (350.5 meters/second). The disclosed serpentine cooling passage may be used in various gas turbine engine components. For exemplary purposes, a turbine blade 64 is described. It should be understood that the cooling passage may also be used in vanes, blade outer air seals, and turbine platforms, for example.

Figure 2A:
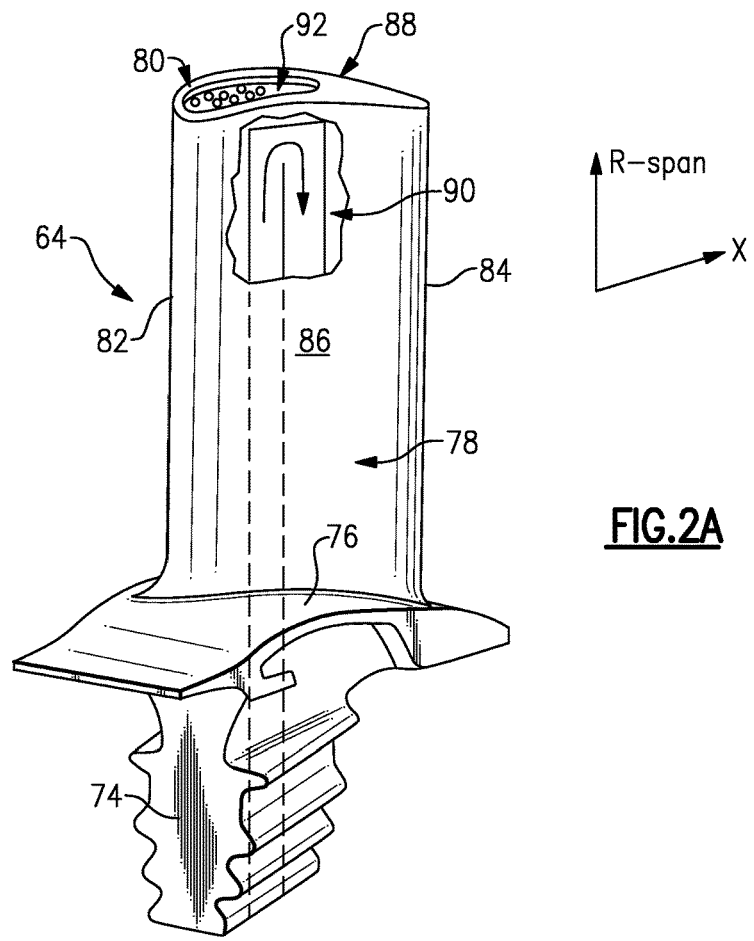
FIG. 2A is a perspective view of the airfoil having the disclosed cooling passage.
Figure 2B:
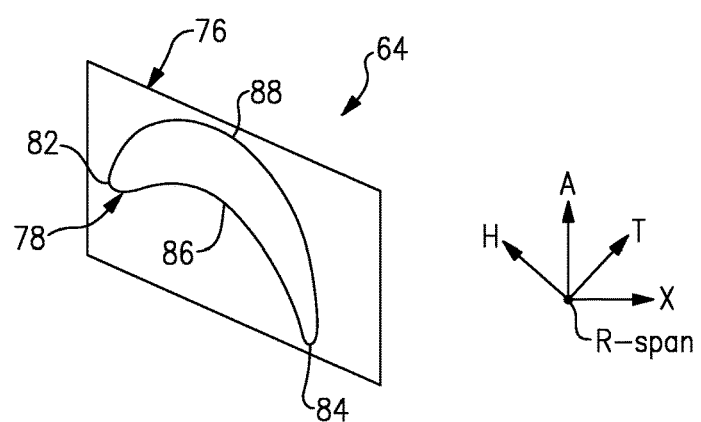
FIG. 2B is a plane view of the airfoil illustrating directional references.

Referring to FIGS. 2A and 2B, a root 74 of each turbine blade 64 is mounted to the rotor disk. The turbine blade 64 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B somewhat schematically illustrates exterior airfoil surface extending in a chord-wise direction H from a leading edge 82 at a forward direction to a trailing edge 84 at an aft direction. The airfoil 78 is provided between pressure (typically concave) and suction (typically convex) wall 86, 88 in an airfoil thickness direction T, which is generally perpendicular to the chord-wise direction H. Multiple turbine blades 64 are arranged circumferentially in a circumferential direction A. The airfoil 78 extends from the platform 76 in the radial direction R, or spanwise, to the tip 80.

The airfoil 78 includes a cooling passage 90 provided between the pressure and suction sides 86, 88. The exterior airfoil surface may include multiple film cooling holes (not shown) in fluid communication with the cooling passage 90, which may be any suitable shape or configuration.

Figure 3A:
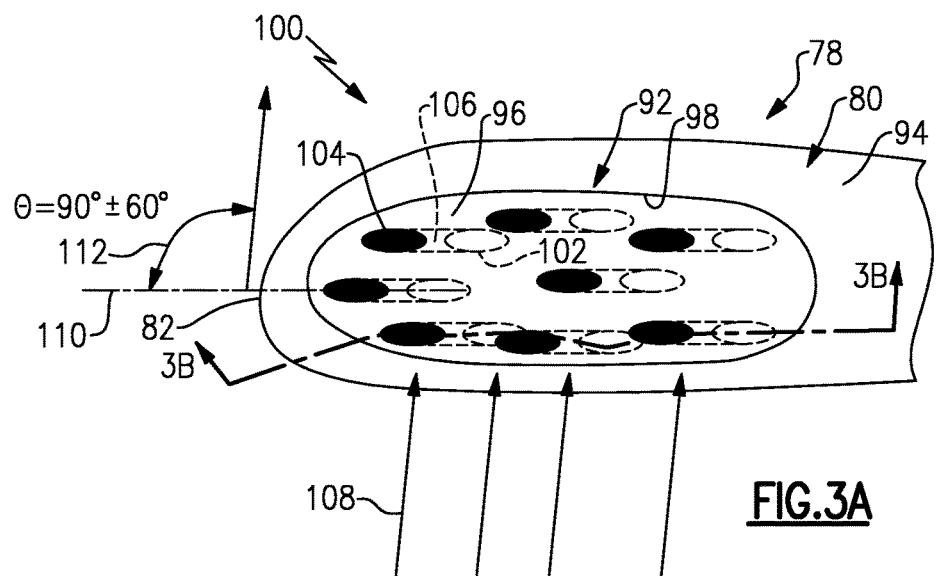
FIG. 3A is a plan view schematically illustrating one squealer pocket cooling hole configuration.
Figure 3B:
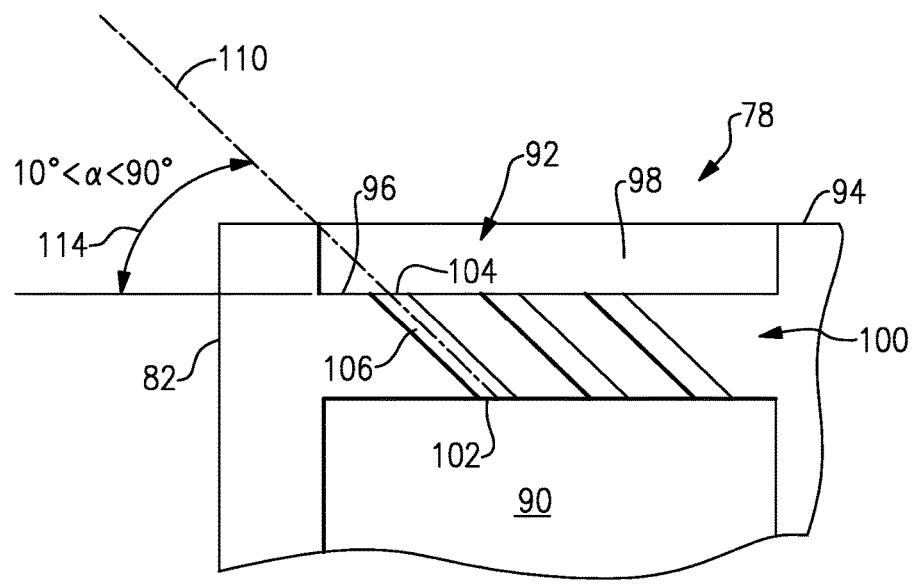
FIG. 3B is a cross-sectional view taken along line 3B-3B in FIG. 3A.

The tip 80 includes a squealer pocket 92, which is shown in more detail in FIGS. 3A and 3B. The squealer pocket 92 is recessed relative to a terminal surface 94 at a radial extremity of the airfoil 78. The squealer pocket 92 is defined by a recessed surface 96 circumscribed by a perimeter surface 98. Multiple squealer pockets can be provided in the tip, and the squealer pocket may be used with or without a tip shelf.

A cooling configuration 100 is provided by an arrangement of cooling holes 106 that communicate a cooling fluid from the cooling passage 90 to the squealer pocket 92. The cooling holes 106 extend from an inlet 102 (in dashed lines) to an outlet 104 (shaded) at the recessed surface 96. The elliptical shape of the outlet provides better film coverage as compared to round outlets. The inlet 102 and outlet 104 are arranged at a first angle 114 in an angular direction 110 relative to the recessed surface 96 (FIG. 3B). In one example, the angular direction is in a range of between 10° and 90°. Angling the cooling holes increases the cooling hole passage length, which increases efficiency.

The arrangement and angular orientation of the cooling holes control the flow characteristics inside and downstream from the squealer pocket 92. The cooling holes are designed to provide desired film coverage, control aerodynamic mixing losses and tip leakage, and effect desired tip streamline orientation.

In several cooling hole configurations (FIGS. 3A-6), the angular direction 110 is toward at least one of the forward and aft directions. In the example cooling hole configuration 100 shown in FIGS. 3A and 3B, the angular direction 110 is toward the forward direction. The tip 80 is configured to receive a flow path fluid (arrows in FIG. 3A) in a flow direction 108. The cooling holes 106 are at a second angle 112 of 90°+/−60° with respect to the flow direction 108. The cooling fluid provided by the cooling holes will tend to spread more when perpendicular to the flow direction, which may be desirable for mixing.

Figure 4:
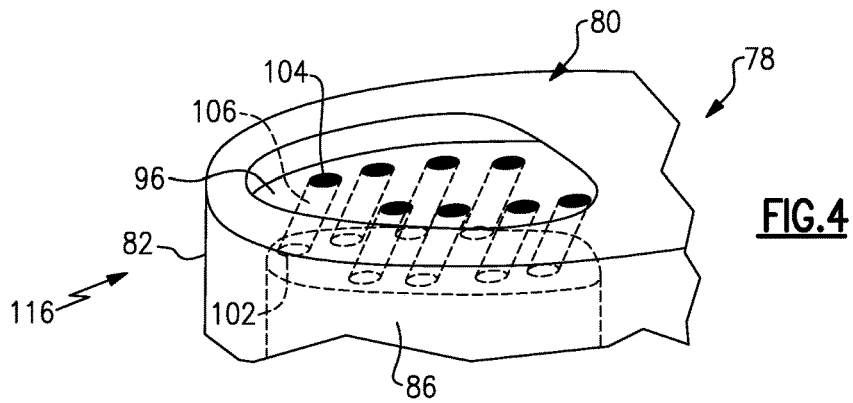
FIG. 4 is a perspective view schematically illustrating another squealer pocket cooling hole configuration.

In the example cooling hole configuration 116 shown in FIG. 4, the angular direction is toward the aft direction.

Figure 5:
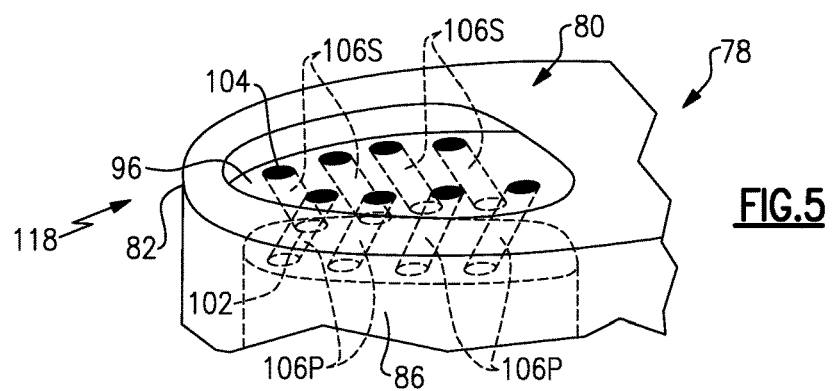
FIG. 5 is a perspective view schematically illustrating yet another squealer pocket cooling hole configuration.

In the example cooling hole configuration 118 shown in FIG. 5, the angular direction is toward both the forward and the aft directions. One set of cooling holes 106P nearest the pressure side 86 are arranged toward one of the forward and aft directions, and another set of cooling holes 106S nearest the suction side 88 are arranged toward the other of the forward and aft directions. In the example shown in FIG. 5, the pressure side cooling holes 106P are arranged toward the aft direction, and the suction side cooling holes 106S are arranged toward the forward direction.

Figure 6:
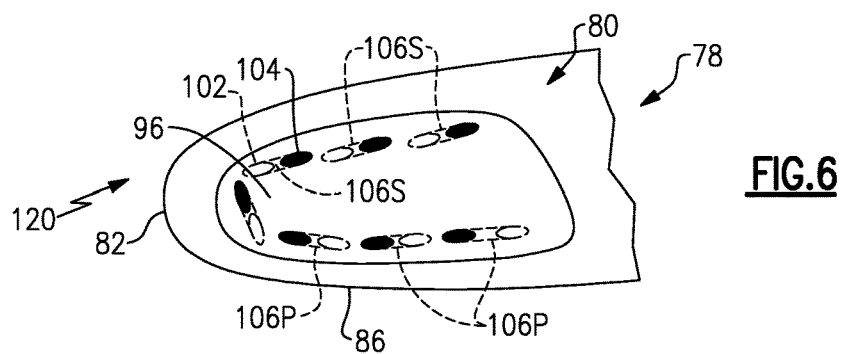
FIG. 6 is a plan view schematically illustrating still another squealer pocket cooling hole configuration.

In the example cooling hole configuration 120 shown in FIG. 6, the cooling holes are arranged in an arc, and the angular direction of each cooling hole is arranged toward an adjacent cooling hole. One set of cooling holes 106P nearest the pressure side 86 are arranged toward one of the forward and aft directions, and another set of cooling holes 106S nearest the suction side 88 are arranged toward the other of the forward and aft directions. In this manner, a swirl effect is created as the fluid from the cooling holes is configured to follow the perimeter 98 of the squealer pocket 92.

Figure 7:
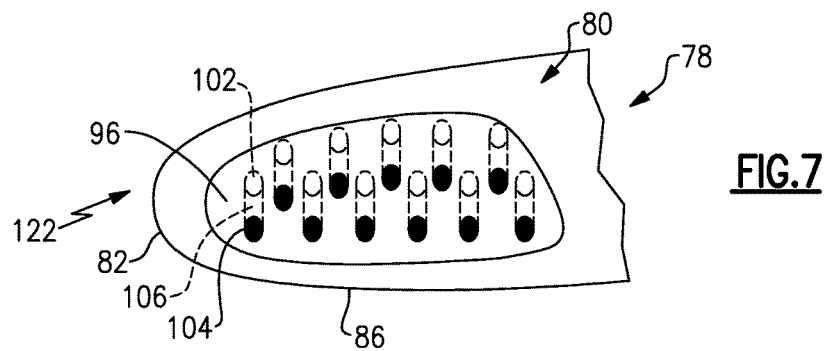
FIG. 7 is a plan view schematically illustrating another squealer pocket cooling hole configuration.

In the example cooling hole configuration 122 shown in FIG. 7, the angular direction is toward at least one of the pressure and suction sides 86, 88, and, in the example, the angular direction is toward both the pressure and suction sides 86, 88.

Figure 8A:
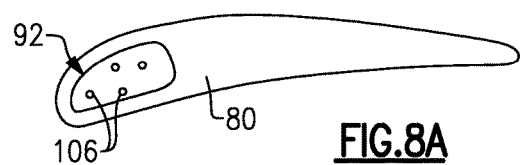
FIG. 8A is a top view of the airfoil tip with the squealer pocket shown in FIG. 4.
Figure 8B:
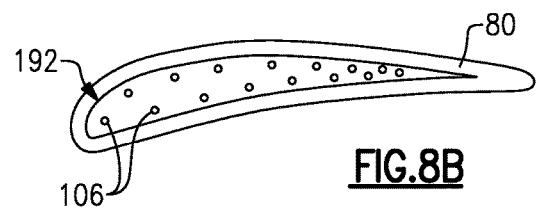
FIG. 8B is a top view on an airfoil tip with a large squealer pocket.
Figure 8C:
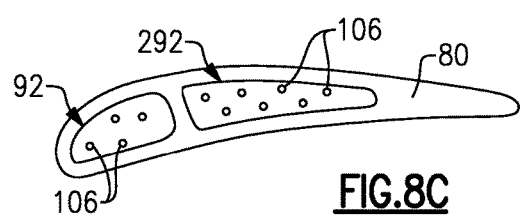
FIG. 8C is a top view of an airfoil tip with two squealer pockets.
Figure 8D:
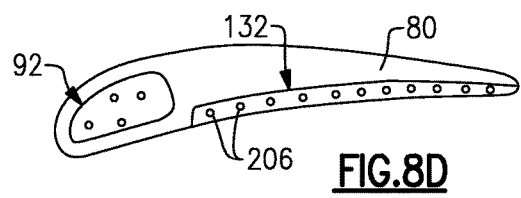
FIG. 8D is a top view of an airfoil tip with a small squealer pocket similar to FIG. 8A with a partial tip shelf.
Figure 8E:
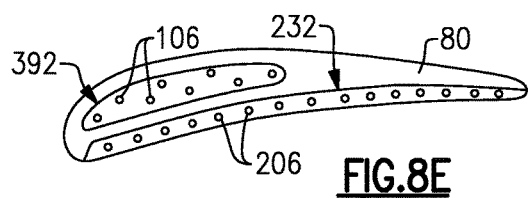
FIG. 8E is a top view of an airfoil tip with a narrow squealer pocket with a full tip shelf.

The disclosed squealer pocket may be configured in various ways to provide desired film characteristics at the tip 80, as shown in FIGS. 8A-8E. FIG. 8A is a top view of the airfoil tip 80 with the small squealer pocket 92 shown in FIG. 4. FIG. 8B is a top view on the airfoil tip 80 with a large squealer pocket 192. FIG. 8C is a top view of the airfoil tip 80 with two squealer pockets 92, 292. FIG. 8D is a top view of the airfoil tip 80 with a small squealer 92 pocket similar to FIG. 8A with a partial tip shelf 132 with cooling holes 206. FIG. 8E is a top view of the airfoil tip 80 with a narrow squealer pocket 392 with a full tip shelf 232 that runs from the leading edge 82 to the trailing edge 84.

The cooling holes may be round/cylindrical shape or may include a diffuser at the exit. These cooling holes are oriented in a way that yields the desired downstream cooling film characteristics. Combinations of the example cooling hole orientations may be used in the same squealer pocket, that is, cooling hole orientations need not be the same. In addition, the cooling holes are oriented to control the tip leakage flow characteristics in the vicinity of the squealer pocket in order to influence turbine efficiency as well as reducing the thermal heat load. These cooling holes may be machined through electromagnetic discharge machining, laser, cast-in, additive manufacturing, or any other means.

The disclosed squealer pocket cooling hole configuration reduces blade erosion, oxidation, and thermal mechanical fatigue life, resulting in improved life cycle costs relating to the engine. The angle of the cooling holes improves downstream film coverage and protects the tip walls from high temperature damage. By modifying the flow structure through cooling hole orientation/arrangement, the disclosed cooling hole configuration can be used to reduce tip leakage and improve turbine efficiency, as well as reduce the external heat transfer into the blade tip.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although example embodiments have been disclosed, a worker of ordinary skill in this art would recognize that certain modifications would come within the scope of the claims. For that and other reasons, the following claims should be studied to determine their true scope and content.

What is claimed is:

1. A gas turbine engine airfoil comprising:
a body that provides an exterior airfoil surface that extends in a radial direction to a tip, the exterior surface has a leading edge in a forward direction and a trailing edge in an aft direction, the exterior airfoil surface includes pressure and suction sides joined at the leading and trailing edges, the tip includes a squealer pocket that has a recessed surface, a cooling passage is arranged in the body, and cooling holes, each of the cooling holes extends from a respective inlet at the cooling passage to a respective outlet at the recessed surface, the cooling holes including first and second sets of cooling holes, the first set of cooling holes comprising all of the cooling holes nearest the pressure side and the second set of cooling holes comprising all of the cooling holes nearest the suction side, the respective inlet and outlet of each cooling hole are arranged at an angle in an angular direction relative to the recessed surface, the angular direction is toward at least one of the forward and aft directions, wherein the angular directions of all of the first set of cooling holes are arranged only toward the aft direction, and the angular direction of all of the second set of cooling holes are arranged only toward the forward direction.

2. The airfoil according to claim 1, wherein the angle is a first angle in a range of between 10° and 90°.

3. The airfoil according to claim 1, wherein the tip is configured to receive a flow path fluid in a flow direction, and the cooling holes extend in a longitudinal direction that is at a second angle of 90°+/−60° with respect to the flow direction.

4. The airfoil according to claim 1, wherein the body is a turbine blade.

5. The airfoil according to claim 1, wherein the tip includes multiple squealer pockets.

6. The airfoil according to claim 1, wherein the tip includes a partial tip shelf.

7. The airfoil according to claim 1, wherein the tip includes a full tip shelf.

8. A gas turbine engine airfoil comprising:
a body that provides an exterior airfoil surface that extends in a radial direction to a tip, the exterior surface has a leading edge in a forward direction and a trailing edge in an aft direction, the exterior airfoil surface includes pressure and suction sides joined at the leading and trailing edges, the tip includes a squealer pocket that has a recessed surface, a cooling passage is arranged in the body, and cooling holes, each of the cooling holes extends from a respective inlet at the cooling passage to a respective outlet at the recessed surface, the cooling holes including first and second sets of cooling holes, the first set of cooling holes comprising all of the cooling holes nearest the pressure side and the second set of cooling holes comprising all of the cooling holes nearest the suction side, the respective inlet and outlet of each cooling hole are arranged at an angle in an angular direction relative to the recessed surface, the angular direction is toward at least one of the forward and aft directions, wherein the angular directions of all of the first set of cooling holes are arranged only toward one of the forward and aft directions, and the angular direction of all of the second set of cooling holes are arranged only toward the other of the forward and aft directions, wherein the cooling holes are arranged in an arc, and the angular direction of each of the cooling holes is arranged toward an adjacent cooling hole.

9. The airfoil according to claim 8, wherein the angle is a first angle in a range of between 10° and 90°.

10. The airfoil according to claim 8, wherein the tip is configured to receive a flow path fluid in a flow direction, and the cooling holes extend in a longitudinal direction that is at a second angle of 90°+/−60° with respect to the flow direction.

11. The airfoil according to claim 8, wherein the body is a turbine blade.

12. The airfoil according to claim 8, wherein the tip includes multiple squealer pockets.

13. The airfoil according to claim 8, wherein the tip includes a partial tip shelf.

14. The airfoil according to claim 8, wherein the tip includes a full tip shelf.

\* \* \* \* \*